US008800040B1

(12) United States Patent
Tan et al.

(10) Patent No.: US 8,800,040 B1
(45) Date of Patent: Aug. 5, 2014

(54) METHODS AND SYSTEMS FOR PRIORITIZING THE MONITORING OF MALICIOUS UNIFORM RESOURCE LOCATORS FOR NEW MALWARE VARIANTS

(75) Inventors: Xiao Dong Tan, Chengdu (CN); Fan Bai, Wahan (CN); Yin Ming Mei, Yubei District (CN)

(73) Assignee: Symantec Corporation, Mountain View, CA (US)

( * ) Notice: Subject to any disclaimer, the term of this patent is extended or adjusted under 35 U.S.C. 154(b) by 1212 days.

(21) Appl. No.: 12/347,641

(22) Filed: Dec. 31, 2008

(51) Int. Cl.
*H04L 29/06* (2006.01)
*H04L 29/14* (2006.01)

(52) U.S. Cl.
USPC .............. 726/24; 726/22; 726/23; 726/25; 726/11; 726/12; 726/13; 726/14; 709/224; 709/225

(58) Field of Classification Search
CPC ..... G06F 21/55; G06F 21/554; G06F 21/561; H04L 63/0236; H04L 63/1408; H04L 63/1441; H04L 63/1491; H04L 63/145; H04L 63/14; H04L 63/1425; H04L 63/1433; H04L 63/1466; H04L 2463/146
USPC .......................................................... 726/24
See application file for complete search history.

(56) References Cited

U.S. PATENT DOCUMENTS

| 7,610,344 | B2 * | 10/2009 | Mehr et al. ..................... 709/206 |
| 7,634,810 | B2 * | 12/2009 | Goodman et al. ............... 726/22 |
| 7,774,380 | B2 * | 8/2010 | Burke et al. ................... 707/803 |
| 7,774,459 | B2 * | 8/2010 | Wang et al. .................... 709/224 |
| 7,941,853 | B2 * | 5/2011 | Rozenberg et al. ............. 726/22 |
| 8,180,761 | B1 | 5/2012 | Cooley et al. |
| 8,302,180 | B1 * | 10/2012 | Gudov et al. ................... 726/13 |
| 8,578,497 | B2 * | 11/2013 | Antonakakis et al. .......... 726/24 |
| 2005/0010855 | A1 * | 1/2005 | Lusky ........................... 714/796 |
| 2005/0050353 | A1 * | 3/2005 | Thiele et al. .................. 713/201 |
| 2005/0188036 | A1 * | 8/2005 | Yasuda ......................... 709/206 |
| 2005/0262556 | A1 * | 11/2005 | Waisman et al. ............... 726/22 |
| 2006/0015630 | A1 * | 1/2006 | Stolfo et al. ................... 709/230 |
| 2006/0075494 | A1 * | 4/2006 | Bertman et al. ................ 726/22 |
| 2006/0161989 | A1 * | 7/2006 | Reshef et al. .................. 726/26 |
| 2006/0253454 | A1 * | 11/2006 | Coppola et al. ................ 707/10 |
| 2007/0016951 | A1 * | 1/2007 | Piccard et al. ................. 726/24 |
| 2007/0143848 | A1 * | 6/2007 | Kraemer et al. ............... 726/23 |

(Continued)

OTHER PUBLICATIONS

Sidiroglou, S., et al, 'An Email Worm Vaccine Architecture', Proceedings of the 1st Information Security Practice and Experience Conference (ISPEC), pp. 97-108, 2005, http://www.cs.columbia.edu/~angelos/Papers/2005/email-worm.pdf.*

(Continued)

*Primary Examiner* — Luu Pham
*Assistant Examiner* — Ronald Baum
(74) *Attorney, Agent, or Firm* — ALG Intellectual Property, LLC (57) ABSTRACT

A computer-implemented method for prioritizing the monitoring of malicious uniform resource locators for new malware variants may comprise: 1) identifying at least one malicious uniform resource locator, 2) collecting priority information relating to the malicious uniform resource locator, wherein the priority information comprises information relevant to prioritizing monitoring of the malicious uniform resource locator for new malware variants, 3) determining, based on the priority information, a monitoring-priority level for the malicious uniform resource locator, and then 4) allocating, based on the monitoring-priority level, a monitoring resource for monitoring the malicious uniform resource locator. Various other methods, systems, and computer-readable media are also disclosed.

19 Claims, 5 Drawing Sheets

(56) References Cited

U.S. PATENT DOCUMENTS

| | | |
|---|---|---|
| 2007/0174915 A1* | 7/2007 | Gribble et al. .................. 726/24 |
| 2007/0186285 A1* | 8/2007 | Hurst et al. .................... 726/25 |
| 2008/0010368 A1 | 1/2008 | Hubbard et al. |
| 2008/0010683 A1 | 1/2008 | Baddour et al. |
| 2008/0098476 A1* | 4/2008 | Syversen ........................ 726/23 |
| 2008/0141332 A1* | 6/2008 | Treinen ............................ 726/1 |
| 2008/0282339 A1* | 11/2008 | Nakae et al. .................... 726/13 |
| 2009/0089859 A1* | 4/2009 | Cook et al. ........................ 726/3 |
| 2009/0164485 A1* | 6/2009 | Burke et al. ................. 707/100 |
| 2010/0332593 A1 | 12/2010 | Barash et al. |
| 2011/0087648 A1 | 4/2011 | Wang et al. |
| 2011/0099633 A1* | 4/2011 | Aziz ............................... 726/24 |

OTHER PUBLICATIONS

Zou, C., et al, 'Feedback Email Worm Defense System for Enterprise Networks', Dept. Elect. & Computer Engineering, Dept. CS, Univ. of MA, Technical Report:TR-04-CSE-05, Apr. 16, 2004, entire document, http://www.cs.ucf.edu/~czou/research/emailDefense-TR.pdf.*

* cited by examiner

METHODS AND SYSTEMS FOR PRIORITIZING THE MONITORING OF MALICIOUS UNIFORM RESOURCE LOCATORS FOR NEW MALWARE VARIANTS

BACKGROUND

Recently, researchers have estimated that the release rate of malicious software ("malware") and other unwanted computer programs may be exceeding that of legitimate software applications. While computer-security vendors offer computer-security computer programs that detect, neutralize, and eliminate malware, many malware developers attempt to avoid such efforts by rapidly (and in some cases automatically) generating thousands or potentially millions of variations of a malicious file.

In recent years, malware developers have turned to the Internet as a means for proliferating malware and their many variants. For example, malware developers may attempt to entice (using, for example, misleading emails or falsified webpages) computer users to follow Internet links (uniform resource locators) that point to malicious resources, such as compromised web pages or viruses.

In an effort to identify and combat malware, security vendors may download and analyze malware from uniform resource locators ("URLs") maintained by malware developers. However, malware developers may counter such efforts by frequently varying the resources to which their malicious URLs point. For instance, a malware developer may, upon determining that a URL maintained by the developer points to a virus that has been detected by security vendors, point the URL to a new, and as of yet unidentified, variant of the virus.

Because the Internet is rapidly becoming a preferred means for propagating malware and malware variants, and also because security vendors typically download and analyze malware from URLs on a tedious case-by-case basis, the instant disclosure identifies a need for systems and methods for rapidly, efficiently, and reliably detecting malware and malware variants propagated using URLs maintained by malware developers.

SUMMARY

The instant disclosure is directed to methods and systems for prioritizing the monitoring of URLs maintained by malware developers ("malicious URLs") for new malware variants. As will be described in greater detail below, a system for accomplishing this task may comprise: 1) a monitoring module for allocating monitoring resources to a malicious URL based on the probability that the URL will be used to propagate new virus variants and 2) a discovery module for identifying, based on known malicious URLs, new malicious URLs.

In one example, an exemplary method for prioritizing the monitoring of malicious URLs for new malware variants may comprise: 1) identifying at least one malicious URL, 2) collecting information relevant to determining how to prioritize the monitoring of the malicious URL, 3) determining, based on the collected information, a monitoring-priority level for the malicious URL, and then 4) allocating, based on the monitoring-priority level, a monitoring resource for monitoring the malicious URL for new malware variants.

Examples of the types of information that may be relevant to determining a monitoring-priority level for a malicious URL may include: 1) when the malicious URL was discovered, 2) the last time that a resource or new malware variant was successfully downloaded from the malicious URL, 3) the frequency of changes to a resource to which the malicious URL points, 4) the type of malicious resource to which the malicious URL points, 5) the prevalence of the malicious URL, 6) the number of malicious URLs located at the same IP address or virtual host, or any other information that may be relevant to prioritizing monitoring of malicious URLs.

In some examples, the method may also comprise employing a formula for determining monitoring-priority levels by: 1) identifying, by analyzing the collected information, characteristics of the malicious URL, 2) assigning numerical weights to the characteristics, and then 3) calculating a weighted sum of the characteristics based on the numerical weights. In some cases, this formula may also include a manual-adjustment number provided by an administrator.

In one example, the method may further comprise monitoring the malicious URL by periodically downloading a resource to which the malicious URL points and then analyzing the resource to determine if it is a new virus variant or other form of malware.

The method may also comprise identifying new malicious URLs by: 1) scanning known malicious executable code for new URLs, 2) executing known malicious executable code on a test computing system (such as a virtual machine) and then monitoring network traffic generated by the test computing system for new URLs, 3) receiving manually-identified URLs from administrators or antivirus engineers, and/or 4) altering at least a portion of a known malicious URL (by, for example, identifying and altering patterns in known malicious URLs) in an attempt to discover new malicious URLs.

The method may also comprise ceasing to monitor malicious URLs if the monitoring-priority level for the URL falls below a predetermined priority threshold and/or if failures to access a resource to which the URL points exceed a predetermined failure threshold.

Features from any of the above-mentioned embodiments may be used in combination with one another in accordance with the general principles described herein. Embodiments of the present disclosure may provide various advantages over prior technologies. For example, methods described herein may allow efficient monitoring of URLs to find new malware. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the present disclosure provide various methods and systems for prioritizing the monitoring of malicious URLs for new malware variants. The phrase "malicious URL," as used herein, may refer to URLs that point, or have pointed, to malware. As used herein, the term "malware" may refer to any type or form of malicious resource to which a URL may point. Examples of malware include, in the context of the instant disclosure, viruses, worms, rootkits, Trojans, phishing attacks, malbots, or the like. As previously mentioned, a monitoring module may be used to allocate resources to monitor URLs for new malware. A discovery module may also be used to identify new malicious URLs.

Figure 1:
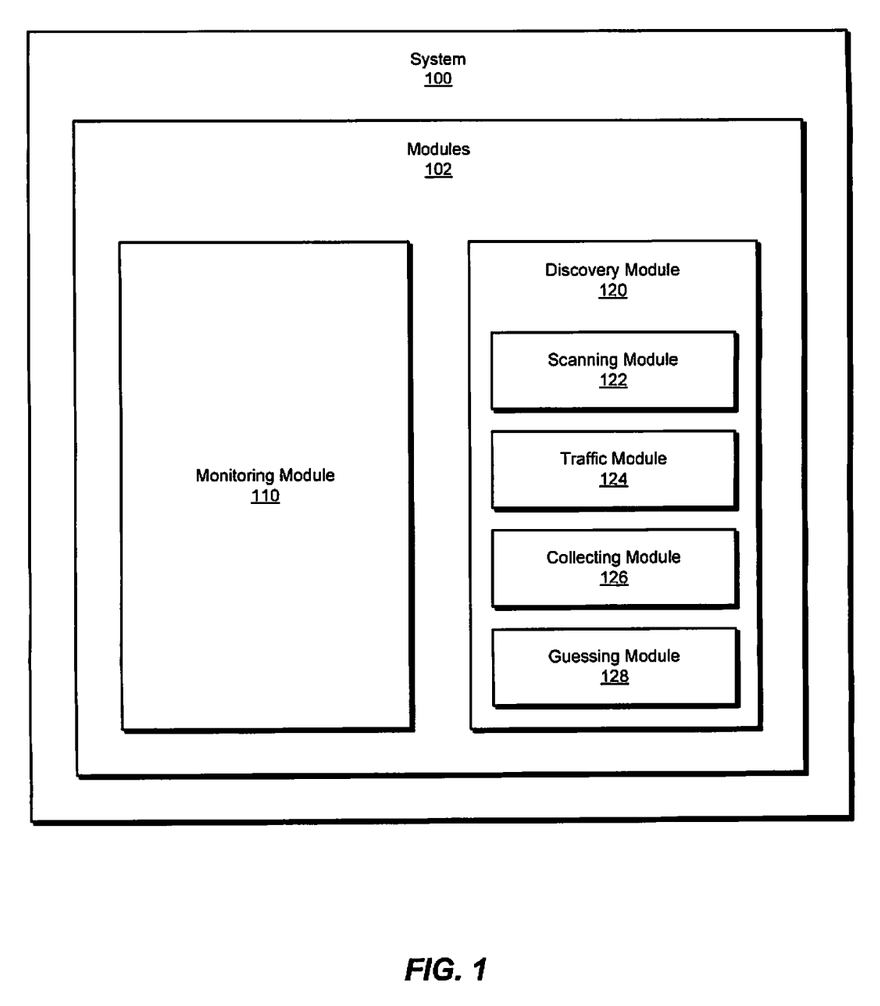
FIG. 1 is a block diagram of an exemplary system for prioritizing the monitoring of malicious URLs for new malware variants according to one embodiment.
Figure 2:
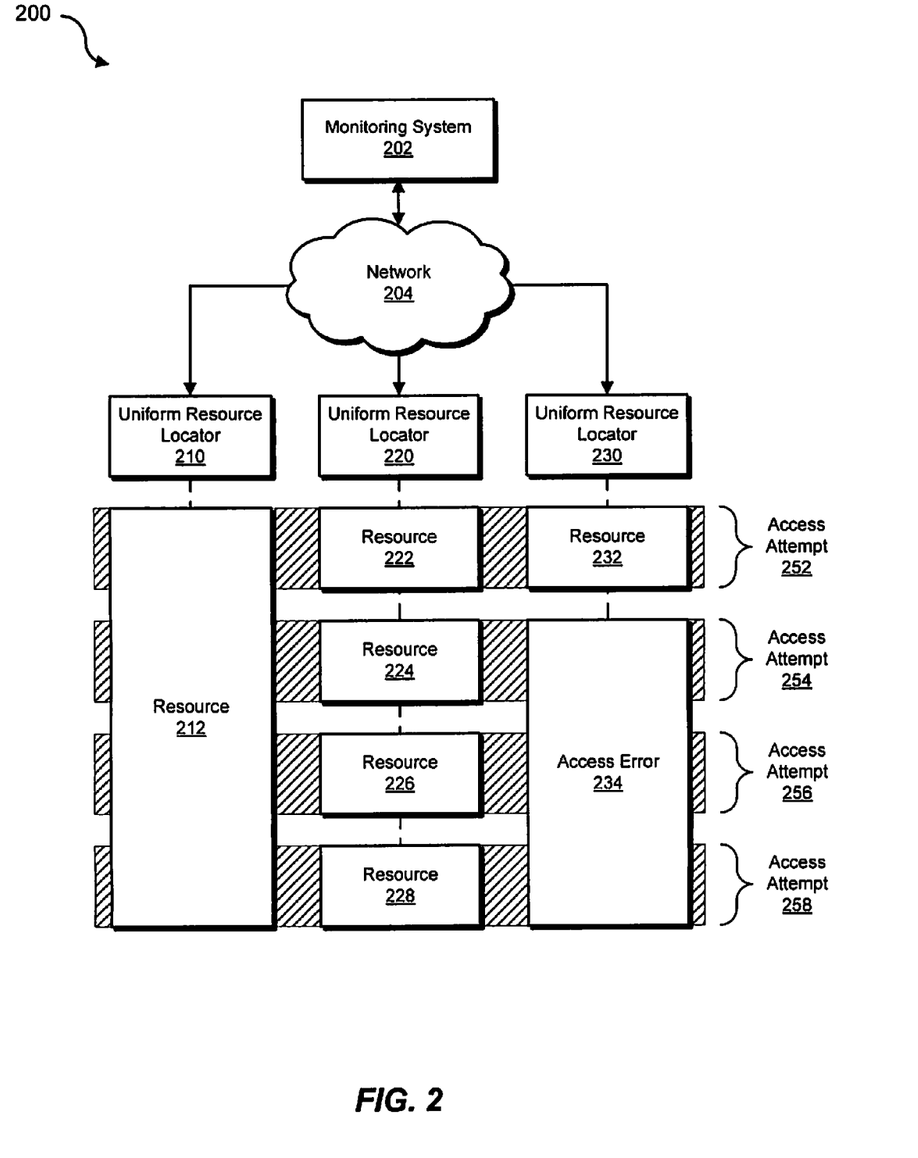
FIG. 2 is a block diagram of an exemplary system for prioritizing the monitoring of malicious URLs for new malware variants according to an additional embodiment.
Figure 3:
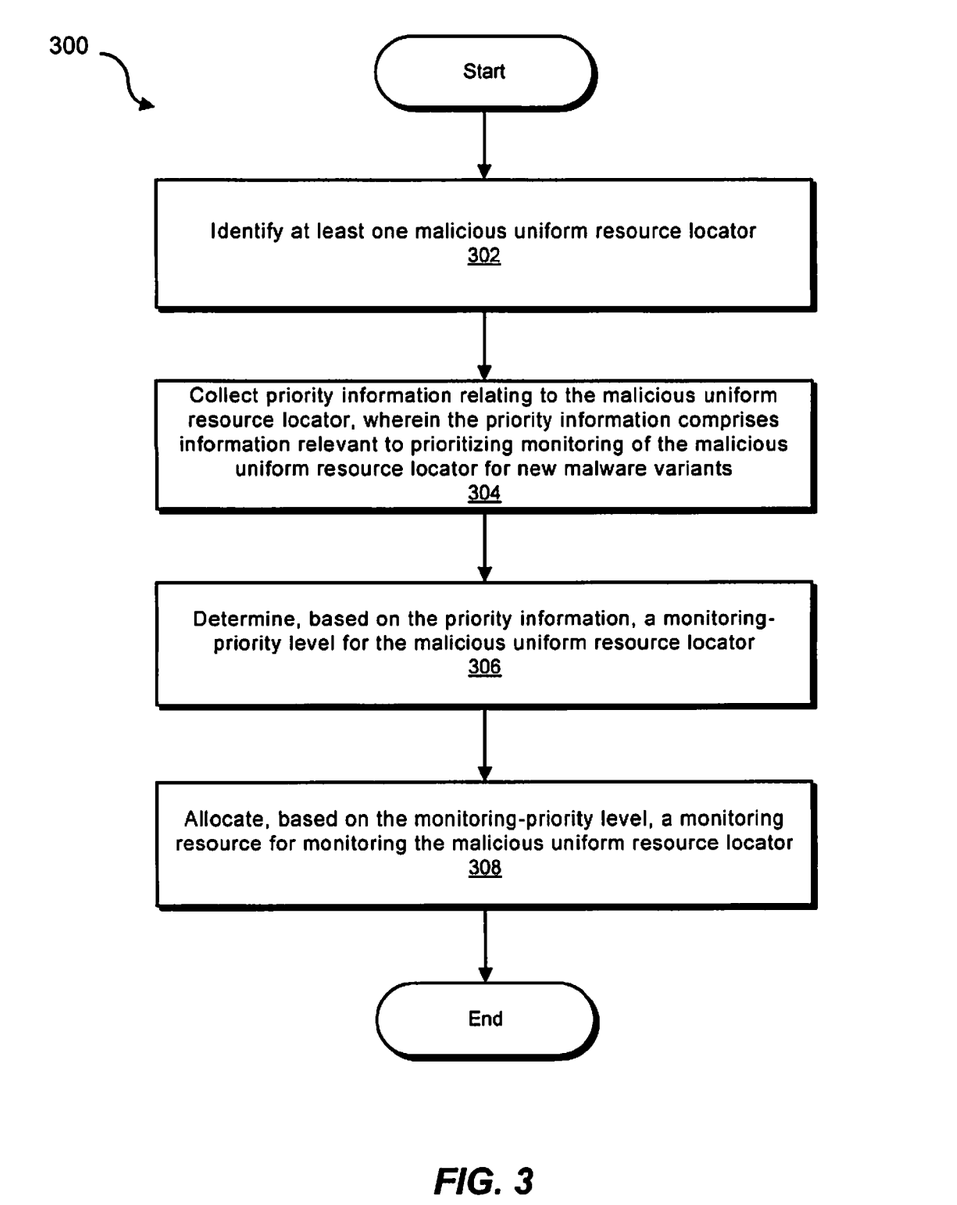
FIG. 3 is a flow diagram of a computer-implemented method for prioritizing the monitoring of malicious URLs for new malware variants.
Figure 4:
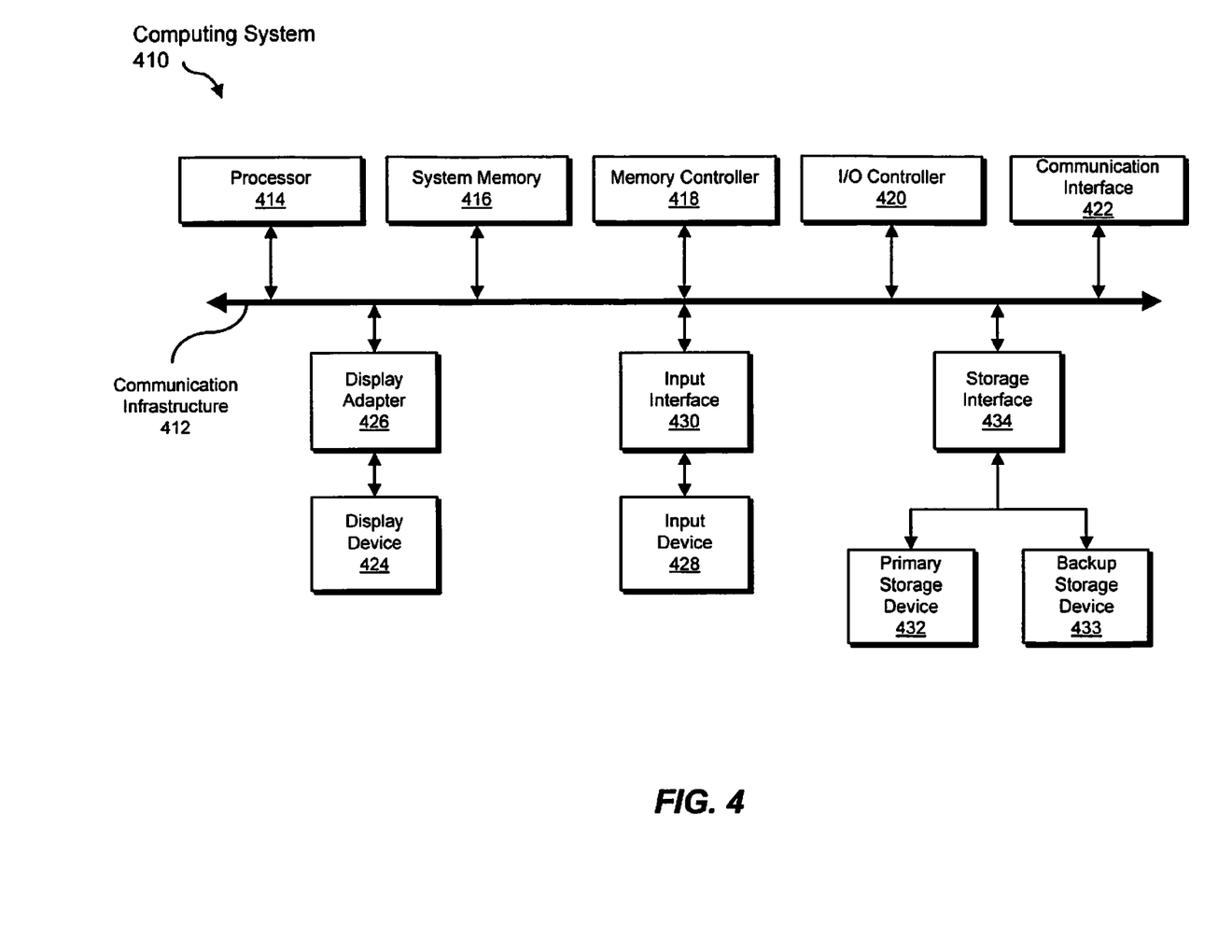
FIG. 4 is a block diagram of an exemplary computing system capable of implementing one or more of the embodiments described and/or illustrated herein.
Figure 5:
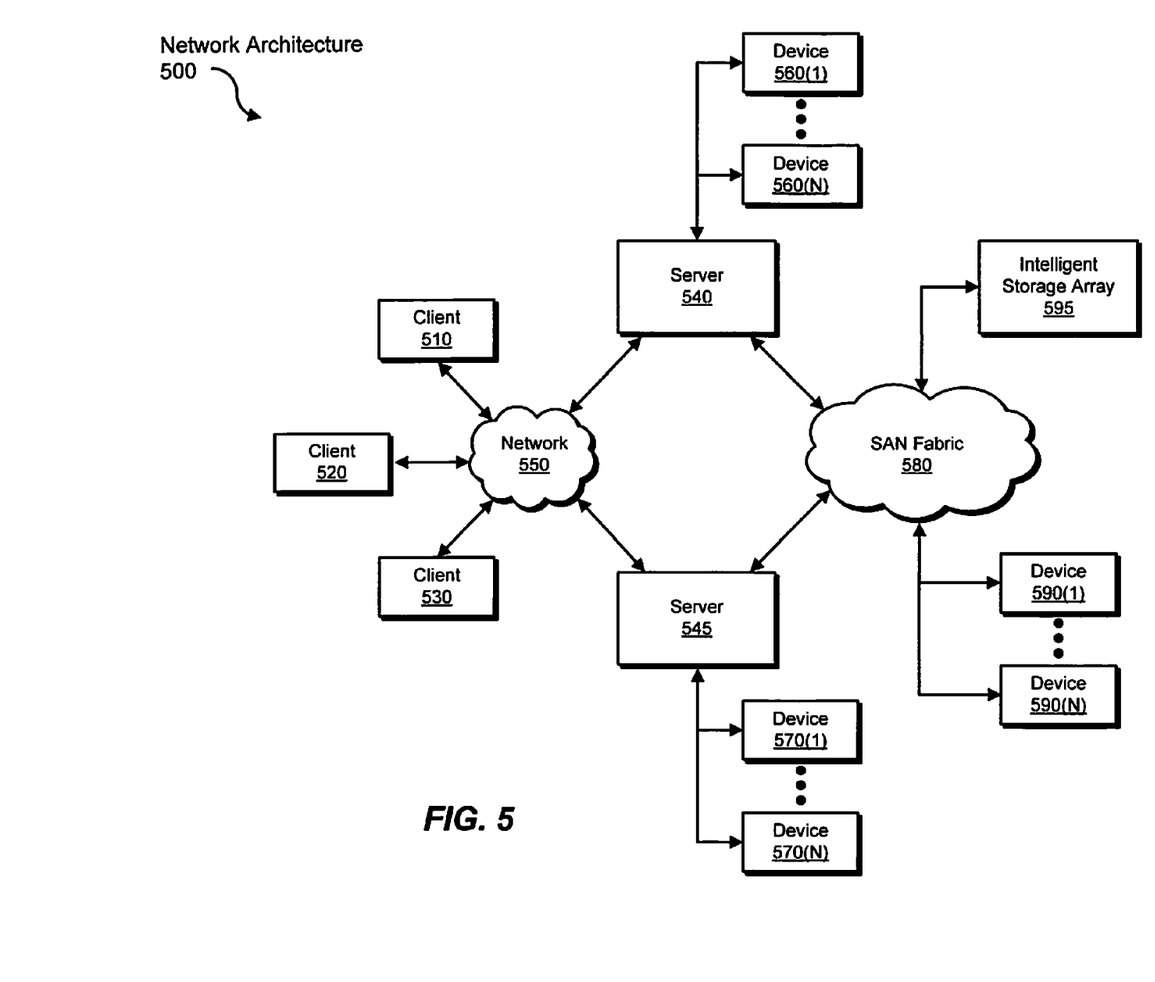
FIG. 5 is a block diagram of an exemplary computing network capable of implementing one or more of the embodiments described and/or illustrated herein.

The accompanying drawings illustrate systems and methods for accomplishing these tasks. FIGS. 1-2 are illustrations of exemplary systems for prioritizing the monitoring of malicious URLs for new malware variants. FIG. 3 illustrates steps of a corresponding computer-implemented method. FIGS. 4 and 5 illustrate, respectively, an exemplary computing system and network architecture capable of implementing one or more of the embodiments described herein.

FIG. 1 is a block diagram of an exemplary system 100 for collecting information about a malicious URL and then determining, based on this information, a monitoring-priority level for monitoring the malicious URL for new malware variants. As used herein, the phrase "monitoring-priority level" may refer to the amount of monitoring resources allocated to monitoring a malicious URL for new malware variants.

As illustrated in FIG. 1, exemplary system 100 may comprise one or more modules 102 for performing one or more tasks. For example, as will be explained in greater detail below, exemplary system 100 may comprise a monitoring module 110 for determining a monitoring-priority level for monitoring a malicious URL. Exemplary system 100 may also comprise a discovery module 120 for discovering new malicious URLs that should be monitored.

In some examples, discovery module 120 may consist of a variety of modules, such as scanning module 122, traffic module 124, collecting module 126, and guessing module 128 in FIG. 1. As will be described in greater detail below, scanning module 122 may identify new malicious URLs by examining existing malicious executable code. Traffic module 124 may identify new malicious URLs by executing malicious code and then monitoring network traffic. Collecting module 126 may identify new malicious URLs by receiving a manually-identified malicious URL from an administrator or user of system 100. Guessing module 128 may identify new malicious URLs by altering a known malicious URL within certain constraints.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules configured to run on one or more computing devices, such as the devices illustrated in FIG. 2 (e.g., monitoring system 202), computing system 410 in FIG. 4, and/or portions of exemplary network architecture 500 in FIG. 5. One or more of modules 102 in FIG. 1 may also represent all or portions of one or more special-purpose computers configured to perform one or more tasks.

FIG. 2 is a block diagram of an exemplary system 200 for prioritizing the monitoring of malicious URLs for new malware variants according to an additional embodiment. As illustrated in this figure, exemplary system 200 may comprise a monitoring system 202, a network 204, and a plurality of URLs 210, 220, and 230.

Monitoring system 202 generally represents any type or form of computing device, such as computing system 410 in FIG. 4, capable of monitoring URLs over a network. In certain examples, monitoring system 202 may comprise one or more of modules 102 in FIG. 1. URLs 210, 220, and 230 may represent malicious URLs that currently point, or have pointed, to malware or other malicious resources.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., GSM network), exemplary network architecture 500 in FIG. 5, or the like. Network 204 may facilitate communication or data transfer using wireless or wired connections.

FIG. 3 is a flow diagram of an exemplary computer-implemented method 300 for collecting information about a malicious URL and then allocating, based on this information, monitoring resources for monitoring the malicious URL for new malware variants. As illustrated in this figure, at step 302 the system may identify at least one malicious URL. For example, monitoring module 110 in FIG. 1 (which may, as detailed above, represent a portion of monitoring system 202 in FIG. 2) may identify malicious URL 210 in FIG. 2.

As detailed above, the malicious URL may represent a URL that currently points, or has at one time pointed to, a malicious resource, such as a virus, malbot, or phishing attack. In one example, identifying the malicious URL may involve retrieving the malicious URL from a local or remote storage device, such as a hard drive or database. In other embodiments, monitoring module 110 in FIG. 1 may receive the malicious URL from a discovery module, such as discovery module 120. For example, as will be described in greater detail below, a module of discovery module 120, such as scanning module 122, may identify, by scanning an infected executable file, a character string in the format of a URL. In this example, discovery module 120 may send the identified URL identified to monitoring module 110.

At step 304, the system may collect priority information relating to the malicious URL. For example, monitoring module 110 in FIG. 1 (which may, as detailed above, represent a portion of monitoring system 202 in FIG. 2) may collect priority information relating to malicious URL 210 in FIG. 2.

As discussed earlier, priority information may include any information relevant to determining how to prioritize monitoring of a malicious URL for new malware variants. The terms "prioritize" or "prioritizing" may refer to determining the amount of monitoring resources that should be allocated to monitoring a malicious URL for new malware variants.

Examples of priority information may include, without limitation, information that identifies: 1) when the malicious URL was added to the monitoring system, 2) the last time that the monitoring system successfully downloaded a resource from the malicious URL, 3) the last time that the monitoring system downloaded a new malicious resource from the malicious URL, 4) the frequency of changes to a resource to which the malicious URL points, 5) the type of malicious resource to which the malicious URL points, 6) the prevalence of the malicious resource to which the malicious URL points, 7) the prevalence of the malicious URL, 8) the number of malicious URLs located at the same IP address or virtual host, or any other information that may be relevant to prioritizing monitoring of the malicious URL.

In one example, the system may collect priority information by generating the priority information from information encountered while monitoring the malicious URL. For example, monitoring system 202 in FIG. 2 may attempt to download a resource from malicious URL 210. If the attempt is successful, monitoring system 202 may store the time of the successful attempt in a database on a hard drive.

In some examples, the system may collect the priority information by receiving the priority information from an external source. For instance, an external computing system may send information about the click rate of malicious URL 210 to monitoring system 202 in FIG. 2. In this example, monitoring system 202 may receive (via a network interface card) the click rate of malicious URL 210 from the external computing system and then save the click rate in a database on a storage device. In another example, monitoring system 202 may receive information about the prevalence of malicious URL 210 from a distributed intrusion prevention system that collected the information.

Returning to FIG. 3, at step 306 the system may determine, based on the priority information collected in step 304, a monitoring-priority level for the malicious URL. For example, monitoring module 110 in FIG. 1 (which may, as detailed above, represent a portion of monitoring system 202 in FIG. 2) may determine, based on the priority information collected in step 304, a monitoring-priority level to assign to URL 210. As detailed above, a monitoring-priority level may refer to the amount of monitoring resources allocated to monitoring a malicious URL for new malware variants.

The system may perform step 306 in a variety of ways. In one example, the system may determine a monitoring-priority level for the malicious URL based on characteristics of the malicious URL obtained by analyzing the priority information. These characteristics may represent discrete criteria or precise measurements. For instance, a criterion may indicate whether the malicious URL is new to the system. In this example, the system may apply this criterion to the malicious URL by examining priority information associated with the malicious resource locator in order to determine: 1) the date and time that the malicious URL was added to the monitoring system and 2) whether the amount of time that has passed since the malicious resource locator was added is beyond a predetermined threshold. The system may also identify additional characteristics of the malicious URL using other criteria, such as whether a virus embodied by a resource that the malicious URL currently points to is currently widespread or whether the malicious URL has a high click rate.

As detailed above, the system may also identify characteristics of the malicious URL using various specific measurements, such as the frequency with which the malicious URL changes its target resource, the number of failed download attempts of the resource to which the malicious URL points, and the length of time that has passed since the last change to the resource to which the malicious URL points.

In some embodiments, the system may attach numerical weights to each characteristic and calculate a weighted sum of the characteristics. The system may also add a manual-adjustment number to the weighted sum. In one example, the system may receive the manual-adjustment number as input from a user interface.

For example, the system may use a formula to determine a monitoring-priority level for a malicious URL. The formula may be the sum of the weights for the satisfied criteria, plus the sum of the product of the measurements and their weights, plus the manual-adjustment number. For instance, suppose that P is the monitoring-priority level, Ci is the weight for criterion i, Ki is the contribution factor to measurement i, Mi is the value of measurement i, and A is the manual-adjustment number. An exemplary monitoring-priority-level formula may then be defined as follows:

$$P = \sum_{i=0}^{i=n} Ci + \sum_{i=0}^{i=n} KiMi + A$$

In one example, the system may use a rule set to determine a monitoring-priority level for the malicious URL. For instance, the system may assign the highest monitoring-priority level to the malicious URL with the largest circulation, and the next highest monitoring-priority level to the malicious URL with the largest resource-change frequency.

Returning to FIG. 3, at step 308 the system may allocate, based on the monitoring-priority level, at least one monitoring resource for monitoring the first URL. For example, monitoring system 202 in FIG. 2 (which may, as detailed above, comprise monitoring module 110 in FIG. 1) may, based on the monitoring-priority level determined in step 306, allocate a monitoring resource for monitoring URL 210. Upon executing step 308, the process flow of exemplary method 300 in FIG. 3 may terminate.

As used herein, the phrase "monitoring resource" may refer to any resource, such as a computing system, that may be used to monitor a malicious URL. Such a task may include attempting to access a resource to which the URL points, downloading the resource, storing the resource, analyzing the resource, storing information resulting from an analysis of the resource, transmitting information resulting from an analysis of the resource, or any other act associated with monitoring a malicious URL.

The system may allocate a monitoring resource for monitoring a malicious URL in a variety of ways. For example, the system may allocate computing resources on a computing system to monitoring URLs. In this example, the system may allocate a greater amount of computing resources to the malicious URL if the malicious URL has a higher monitoring-priority level. The allocation of computing resources on the computing system may result in the allocation of the use of a network interface card on the computing system, a processor in the computing system, and/or a storage unit in the computing system.

In certain embodiments, the system may monitor the malicious URL by periodically downloading a resource to which the malicious URL points. For example, a monitoring module may allocate one monitoring attempt a day to a malicious URL. In this example, the monitoring module may attempt to download the resource that the URL points to once per day.

According to some embodiments, the system may analyze the resource to determine if it is a new malicious resource. The system may attempt to determine whether a resource pointed to by a malicious URL represents a new malicious resource in a variety of ways, including, for example, by: 1) determining whether at least a portion of the resource matches at least one signature within a virus-definition set supplied by a security vendor, 2) determining whether the resource triggers a malware-detection heuristic supplied by a security vendor, 3) if the resource is an executable file, executing the file within a virtual or emulated computing environment to determine whether the file contains malicious payload, or 4) verifying the legitimacy of the resource through any other suitable means.

For example, a monitoring module may calculate a hash for a resource pointed to by a malicious URL and then compare the hash with a database of hashes for known malicious resources. If the hash does not match any hash in the database, the monitoring module may determine that the resource is a new malicious resource. The algorithm used to generate the hash may be MD5, SHA-1, or any other hash algorithm.

In some embodiments, the system may allocate the monitoring resource in proportion to the monitoring-priority level. In other embodiments, the monitoring module may allocate the monitoring resource according to a tier in which the monitoring-priority level falls. In some embodiments, the monitoring resource may reside in the same computing system as the monitoring module. In alternative embodiments, the monitoring resource may reside in a distinct computing system.

Although not illustrated in FIG. 3, exemplary method 300 may further comprise steps for determining whether to cease monitoring of a malicious URL. For example, monitoring system 202 in FIG. 2 may terminate monitoring of URL 210 if a determined monitoring-priority level for URL 210 is below a set threshold and/or if failures to access resource 210 through URL 210 exceed a set threshold. For example, a threshold for failure attempts may be 10, and monitoring system 202 may fail to access resource 212 (pointed to by URL 210) on 11 different occasions. In this example, monitoring system 202 may cease monitoring URL 210.

In various embodiments, the system may use a formula to determine whether to terminate monitoring of a malicious URL. In some examples, the formula may be a logical conjunction of two requirements: 1) that a monitoring-priority level for the malicious URL falls below a predetermined threshold and 2) that the number of failed attempts to access a resource to which the malicious URL points equals or exceeds a predetermined threshold. For instance, suppose that P is a monitoring-priority level for a malicious URL, $P_{RemoveThreshold}$ is a monitoring-priority-level threshold for terminating monitoring of the malicious URL, $M_2$ is the number of failed attempts to access a resource to which the malicious URL points, and $V_{FailureTimesThreshold}$ is a failure-count threshold for terminating monitoring of the malicious URL. The formula may then be defined as follows:

$$P<P_{RemoveThreshold} \text{ AND } M_2>=V_{FailureTimesThreshold}$$

Although not illustrated in FIG. 3, in some embodiments exemplary method of FIG. 3 may further comprise steps for identifying new malicious URLs. For instance, a discovery module, such as discovery module 120 in FIG. 2 (which may, as detailed above, be stored and configured to run on monitoring system 202 in FIG. 2), may identify a new malicious URL 220 in FIG. 2.

In one example, the discovery module may identify new malicious URLs by using a scanning module (such as scanning module 122 in FIG. 1), a traffic module (such as traffic module 124), a collecting module (such as collecting module 126), and/or a guessing module (such as guessing module 128). The discovery module may then transmit the new malicious URL(s) to the monitoring module for prioritization and possible monitoring.

In one example, a scanning module (such as scanning module 122 in FIG. 1) may identify new malicious URLs by scanning known malicious executable code for URLs. For example, scanning module 122 in FIG. 1 may scan malicious executable code downloaded from a known malicious URL (such as URL 210 in FIG. 2) in an attempt to identify character strings within the malicious code that correspond to URLs. The malicious executable code may be any executable code suspected or known to comprise malware, such as a resource downloaded by a monitoring module, such as monitoring module 110 in FIG. 1, from a known malicious URL. Alternatively, the malicious executable code may be a sample procured and saved by a security vendor and retrieved by the scanning module.

Similarly, a traffic module (such as traffic module 124 in FIG. 1) may attempt to identify new malicious URLs by: 1) identifying malicious executable code, 2) executing the malicious executable code on a test computing system (such as a virtual machine), and then 3) monitoring network traffic generated by the test computing system to see if the traffic originates from or is directed to a URL.

In an additional example, a collecting module (such as collecting module 126 in FIG. 1) may identify new malicious URLs by receiving one or more manually-identified URLs from an administrator or user. For example, an antivirus engineer may manually identify and submit malicious URLs to a central database. In this example, collecting module may access and retrieve the manually-identified malicious URLs from the central database.

In another example, a guessing module (such as guessing module 128 in FIG. 1) may generate new malicious URLs by altering at least a portion of known malicious URLs. For example, the guessing module may: 1) identify a pattern in the malicious URL and then 2) alter the malicious URL so that the resulting URL still matches the pattern.

For example, the guessing module may identify a pattern within a known malicious URL that includes a number string in a certain location. In this example, the guessing module may replace the identified number string with a different number string in an attempt to generate a new malicious URL. For example, if a known malicious URL is "http://example.com/0001.exe," then the guessing module may generate the string "http://example.com/0002.exe" in an attempt to discover a new malicious URL.

The following will provide, for illustrative purposes only, a description of an exemplary implementation of the systems and methods described herein. In this example, monitoring system 202 in FIG. 2 may attempt to access resources pointed to by URLs 210, 220, and 230 on four separate occasions. At the first access attempt, (access attempt 252), URL 210 may point to resource 212, URL 220 may point to resource 222, and URL 230 may point to resource 232. In this scenario, monitoring system 202 may analyze resources 212, 222, and 232 and store a hash for each resource.

At the second access attempt (access attempt 254), URL 210 may continue to point to resource 212, while URL 220 may now point to resource 224 and an attempt to access a resource through URL 230 may result in an access error 234. In this scenario, monitoring system 202 may record a resource change for URL 220, analyze resource 224, and record an access error for URL 230.

At the third access attempt (access attempt 256), URL 210 may still point to resource 212, while URL 220 may now point to resource 226 and an attempt to access a resource through URL 230 may still result in access error 234. Accordingly, monitoring system 202 may record the change to URL 220, analyze new resource 226, and record the second failed access attempt for URL 230.

At the fourth access attempt (access attempt 258), URL 210 may still point to resource 212, while URL 220 may now point to resource 228 and an attempt to access a resource through URL 230 may still result in access error 234. Accordingly, monitoring system 202 may record the change to URL 220, analyze new resource 228, and record the third failed access attempt for URL 230.

In this exemplary scenario, monitoring system 202 may assign a low monitoring-priority level to URL 210 since the resource that URL 210 points to did not change. In this example, monitoring system 202 may infrequently monitor URL 210. Conversely, monitoring system 202 may assign a high monitoring-priority level to URL 220 since the resource it pointed to changed frequently. In this case, monitoring system 202 may frequently monitor URL 220 in the future.

In addition, monitoring system 202 may assign a low monitoring-priority level to URL 230 due to the high access-error rate associated with URL 230. Alternatively, monitoring system 202 may determine that the number of access failures for URL 230 exceeds a threshold and, consequently, terminate monitoring of URL 230.

By prioritizing the monitoring of malicious URLs, the systems and methods described herein may enable security vendors to reliably, timely, and efficiently identify new malware variants. This may in turn enable vendors to improve their ability to quickly and effectively respond to new security threats.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may comprise at least one processor 414 and system memory 416.

Processor 414 generally represents any type or form of processing unit capable of processing data or interpreting and executing instructions. In certain embodiments, Processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the identifying, collecting, determining, allocating, calculating, monitoring, downloading, analyzing, scanning, executing, receiving, generating, altering, and/or replacing steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may comprise both a volatile memory unit (such as, for example, system memory 416) and a non-volatile storage device (such as, for example, primary storage device 432, as described in detail below).

In certain embodiments, exemplary computing system 410 may also comprise one or more components or elements in addition to processor 414 and system memory 416. For example, as illustrated in FIG. 4, computing system 410 may comprise a memory controller 418, an input/output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments, memory controller 418 may control communication between processor 414, system memory 416, and I/O controller 420 via communication infrastructure 412. In certain embodiments, memory controller 418 may perform and/or is a means for performing, either alone or in combination with other elements, one or more of the steps or features described and/or illustrated herein, such as identifying, collecting, determining, allocating, calculating, monitoring, downloading, analyzing, scanning, executing, receiving, generating, altering, and/or replacing.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for identifying, collecting, determining, allocating, calculating, monitoring, downloading, analyzing, scanning, executing, receiving, generating, altering, and/or replacing steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments, communication interface 422 may facilitate communication between computing system 410 and a private or public network comprising additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the internet. Communication interface 422 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the identifying, collecting, determining, allocating, calculating, monitoring, downloading, analyzing, scanning, executing, receiving, generating, altering, and/or replacing steps disclosed herein. Communication interface 422 may also be used to perform and/or be a means for performing other steps and features set forth in the instant disclosure.

As illustrated in FIG. 4, computing system 410 may also comprise at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also comprise at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the identifying, collecting, determining, allocating, calculating, monitoring, downloading, analyzing, scanning, executing, receiving, generating, altering, and/or replacing steps disclosed herein. Input device 428 may also be used to perform and/or be a means for performing other steps and features set forth in the instant disclosure.

As illustrated in FIG. 4, exemplary computing system 410 may also comprise a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also comprise other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Storage devices 432 and 433 may also be used, for example, to perform and/or be a means for performing, either alone or in combination with other elements, one or more of the identifying, identifying, collecting, determining, allocating, calculating, monitoring, downloading, analyzing, scanning, executing, receiving, generating, altering, and/or replacing steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or to run certain software applications. Network 550 generally represents any telecommunication or computer network; including, for example, an intranet, a wide area network (WAN), a local area network (LAN), a personal area network (PAN), or the internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the internet) for exchanging data, the embodiments described and/or illustrated herein are not limited to the internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and/or distributed to client systems 510, 520, and 530 over network 550. Accordingly, network architecture 500 may perform and/or be a means for performing, either alone or in combination with other elements, one or more of the identifying, collecting, determining, allocating, calculating, monitoring, downloading, analyzing, scanning, executing, receiving, generating, altering, and/or replacing steps disclosed herein. Network Architecture 500 may also be used to perform and/or be a means for performing other steps and features set forth in the instant disclosure.

As detailed above, computing system 410 and/or one or more of the components of network architecture 500 may perform and/or be a means for performing, either alone or in combination with other elements, one or more steps of a method for prioritizing the monitoring of malicious uniform resource locators for new malware variants. In one example, such a method may comprise: 1) identifying at least one malicious uniform resource locator, 2) collecting priority information relating to the malicious uniform resource locator, wherein the priority information comprises information relevant to prioritizing monitoring of the malicious uniform resource locator for new malware variants, 3) determining, based on the priority information, a monitoring-priority level for the malicious uniform resource locator, and then 4) allocating, based on the monitoring-priority level, a monitoring resource for monitoring the malicious uniform resource locator.

In one example, determining the monitoring-priority level for the malicious uniform resource locator may comprise: 1) identifying, by analyzing the priority information, characteristics of the malicious uniform resource locator, 2) assigning numerical weights to the characteristics, and then 3) calculating a weighted sum of the characteristics based on the numerical weights. In some examples, a manual-adjustment number may also be added to the weighted sum of the characteristics.

Examples of characteristics of the malicious uniform resource locator include, without limitation, an indication of whether monitoring of the malicious uniform resource locator recently began, an indication of whether the malicious uniform resource locator has a high visit rate, an indication of whether a resource to which the malicious uniform resource locator points is malware in wide circulation, the frequency of changes to the resource, the number of failed attempts to access the resource, the amount of time passed since the last successful attempt to access the resource, the prevalence of the malicious uniform resource locator in a network, and the number of malicious uniform resource locators at the same IP address or virtual host as the malicious uniform resource locator.

In some examples, the method may further comprise monitoring the malicious uniform resource locator with the monitoring resource by periodically downloading a resource to which the malicious uniform resource locator points and/or analyzing the resource to determine if the resource is a new malicious resource.

The method may also comprise identifying at least one new malicious uniform resource locator by, for example: 1) scanning known malicious executable code for uniform resource locators, 2) executing known malicious executable code on a test computing system (such as a virtual machine) and then monitoring network traffic generated by the test computing system for uniform resource locators, 3) receiving manually-identified uniform resource locators from administrators or antivirus engineers, and/or 4) altering at least a portion of a known malicious uniform resource locator.

In some examples, altering at least a portion of the malicious uniform resource locator may comprise identifying a pattern in the malicious uniform resource locator and then altering the malicious uniform resource locator so that it still matches the pattern. In this example, the pattern may comprise the location of a first number string in the malicious uniform resource locator and altering the malicious uniform resource locator may comprise replacing the first number string with a second number string.

The method may also comprise terminating monitoring of the malicious uniform resource locator if the monitoring-priority level is below a priority threshold and/or if failures to access a resource to which the malicious uniform resource locator points exceed a failure threshold.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable tiles that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for prioritizing the monitoring of malicious uniform resource locators for new malware variants, the method comprising:
   identifying a plurality of malicious uniform resource locators, wherein each malicious uniform resource locator within the malicious uniform resource locators has previously pointed to a corresponding malware sample;
   collecting priority information for each of the malicious uniform resource locators to determine a non-zero and non-one probability that each of the malicious uniform resource locators will point to a new malware sample that is distinct from the corresponding malware sample previously pointed to by the malicious uniform resource locator;
   assigning a monitoring-priority level to each malicious uniform resource locator that monotonically increases with the probability that the malicious uniform resource locator will point to a new malware sample that is distinct from the corresponding malware sample previously pointed to by the malicious uniform resource locator, wherein assigning the monitoring-priority level optionally comprises modifying the monitoring-priority level with a manual-adjustment number;
   allocating an amount of monitoring resources for monitoring the malicious uniform resource locator for new malware samples based on the monitoring-priority level;
   monitoring each malicious uniform resource locator for new malware samples using the amount of monitoring resources allocated for monitoring the malicious uniform resource locator based on the monitoring-priority level, wherein at least one lower-priority malicious uniform resource locator within the malicious uniform resource locators is monitored for new malware samples using an amount of monitoring resources that is less than an amount of monitoring resources allocated to monitoring a higher-priority malicious uniform resource locator within the malicious uniform resource locators.

2. The method of claim 1, wherein assigning the monitoring-priority level to each malicious uniform resource locator comprises:
   identifying, by analyzing the priority information, characteristics of the malicious uniform resource locator;
   assigning numerical weights to the characteristics;
   calculating a weighted sum of the characteristics based on the numerical weights.

3. The method of claim 2, wherein assigning the monitoring-priority level to each malicious uniform resource locator further comprises adding the manual-adjustment number to the weighted sum of the characteristics.

4. The method of claim 2, wherein the characteristics comprise at least one of:
   an indication of whether monitoring of the malicious uniform resource locator recently began;
   an indication of whether the malicious uniform resource locator has a high visit rate;
   an indication of whether the item of malware to which the malicious uniform resource locator has pointed is in wide circulation;
   the frequency of changes to the corresponding malware sample;
   the number of failed attempts to access the corresponding malware sample;
   the amount of time passed since the last successful attempt to access the corresponding malware sample;
   the prevalence of the malicious uniform resource locator in a network;
   the number of malicious uniform resource locators at the same IP address or virtual host as the malicious uniform resource locator.

5. The method of claim 1, wherein monitoring each malicious uniform resource locator comprises periodically downloading a resource to which the malicious uniform resource locator points.

6. The method of claim 5, further comprising analyzing the resource to determine if the resource comprises a new malicious variant.

7. The method of claim 1, further comprising identifying at least one new malicious uniform resource locator.

8. The method of claim 7, wherein identifying the new malicious uniform resource locator comprises:
   identifying malicious executable code;
   scanning the malicious executable code for uniform resource locators.

9. The method of claim 7, wherein identifying the new malicious uniform resource locator comprises:
   identifying malicious executable code;
   executing the malicious executable code on a test computing system;
   monitoring network traffic generated by the test computing system for uniform resource locators.

10. The method of claim 9, wherein executing the malicious executable code on the test computing system comprises executing the malicious executable code within a virtual machine.

11. The method of claim 7, wherein identifying the new malicious uniform resource locator comprises receiving a manually-identified uniform resource locator.

12. The method of claim 7, wherein identifying the new malicious uniform resource locator comprises generating the new malicious uniform resource locator by altering at least a portion of at least one of the malicious uniform resource locators.

13. The method of claim 12, wherein altering at least a portion of at least one of the malicious uniform resource locators comprises:
   identifying a pattern in at least one of the malicious uniform resource locators;
   altering at least one of the malicious uniform resource locators so that it still matches the pattern.

14. The method of claim 13, wherein:
   the pattern comprises the location of a first number string in at least one of the malicious uniform resource locators;
   altering at least one of the malicious uniform resource locators comprises replacing the first number string with a second number string.

15. The method of claim 1, further comprising terminating monitoring of at least one malicious uniform resource locator when:
   a monitoring-priority level for the malicious uniform resource locator falls below a priority threshold;
   failures to access a resource to which the malicious uniform resource locator points exceed a failure threshold.

16. A computing system for prioritizing the monitoring of malicious uniform resource locators for new malware variants, the system comprising:
   a memory for storing a monitoring module;
   a processor in communication with the memory, the processor executes the monitoring module to:
   identify a plurality of malicious uniform resource locators, wherein each malicious uniform resource locator within the malicious uniform resource locators has previously pointed to a corresponding malware sample;
   collect priority information for each of the malicious uniform resource locators to determine a non-zero and non-one probability that each of the malicious uniform resource locators will point to a new malware sample that is distinct from the corresponding malware sample previously pointed to by the malicious uniform resource locator;
   assign a monitoring-priority level to each malicious uniform resource locator that monotonically increases with the probability that the malicious uniform resource locator will point to a new malware sample that is distinct from the corresponding malware sample previously pointed to by the malicious uniform resource locator, wherein assigning the monitoring-priority level optionally comprises modifying the monitoring-priority level with a manual-adjustment number;
   allocate an amount of monitoring resources for monitoring the malicious uniform resource locator for new malware samples based on the monitoring-priority level;
   monitor each malicious uniform resource locator for new malware samples using the amount of monitoring resources allocated for monitoring the malicious uniform resource locator based on the monitoring-priority level, wherein at least one lower-priority malicious uniform resource locator within the malicious uniform resource locators is monitored for new malware samples using an amount of monitoring resources that is less than an amount of monitoring resources allocated to monitoring a higher-priority malicious uniform resource locator within the malicious uniform resource locators.

17. The system of claim 16, wherein the monitoring module is further programmed to assign the monitoring-priority level to each malicious uniform resource locator by:
   identifying, by analyzing the priority information, characteristics of the malicious uniform resource locator;
   assigning numerical weights to the characteristics;
   calculating a weighted sum of the characteristics based on the numerical weights.

18. The system of claim 16, further comprising a discovery module programmed to identify at least one new malicious uniform resource locator, the discovery module comprising at least one of:
   a scanning module programmed to:
      identify malicious executable code;
      scan the malicious executable code for uniform resource locators;
   a traffic module programmed to:
      execute the malicious executable code on a test computing system;
      monitor network traffic generated by the test computing system for uniform resource locators;
   a collecting module programmed to receive a manually-identified uniform resource locator;
   a guessing module programmed to generate the new malicious uniform resource locator by altering at least a portion of at least one of the malicious uniform resource locators.

19. A non-transitory computer-readable medium comprising one or more computer-executable instructions that, when executed by a computing device, cause the computing device to:
   identify a plurality of malicious uniform resource locators, wherein each malicious uniform resource locator within the malicious uniform resource locators has previously pointed to a corresponding malware sample;
   collect priority information for each of the malicious uniform resource locators to determine a non-zero and non-one probability that each of the malicious uniform resource locators will point to a new malware sample that is distinct from the corresponding malware sample previously pointed to by the malicious uniform resource locator;
   assign a monitoring-priority level to each malicious uniform resource locator that is monotonically increases with the probability that the malicious uniform resource locator will point to a new malware sample that is distinct from the corresponding malware sample previously pointed to by the malicious uniform resource locator, wherein assigning the monitoring-priority level optionally comprises modifying the monitoring-priority level with a manual-adjustment number;

allocate an amount of monitoring resources for monitoring the malicious uniform resource locator for new malware samples based on the monitoring-priority level;

monitor each malicious uniform resource locator for new malware samples using the amount of monitoring resources allocated for monitoring the malicious uniform resource locator based on the monitoring-priority level, wherein at least one lower-priority malicious uniform resource locator within the malicious uniform resource locators is monitored for new malware samples using an amount of monitoring resources that is less than an amount of monitoring resources allocated to monitoring a higher-priority malicious uniform resource locator within the malicious uniform resource locators.

\* \* \* \* \*

UNITED STATES PATENT AND TRADEMARK OFFICE
CERTIFICATE OF CORRECTION

PATENT NO. : 8,800,040 B1  Page 1 of 1
APPLICATION NO. : 12/347641
DATED : August 5, 2014
INVENTOR(S) : Xiao Dong Tan, Fan Bai and Yin Ming Mei It is certified that error appears in the above-identified patent and that said Letters Patent is hereby corrected as shown below:

In the Claims

Claim 19, at column 18, lines 60 to 61, should read:
assign a monitoring-priority level to each malicious uniform resource locator that monotonically increases Signed and Sealed this
Tenth Day of February, 2015

Michelle K. Lee
*Deputy Director of the United States Patent and Trademark Office*